United States Patent Office 3,401,191
Patented Sept. 10, 1968

3,401,191
TETRAFLUORONITROBENZONITRILES
Leon Jerzy Belf, Avonmouth, Bristol, England, assignor to Imperial Smelting Corporation (N.S.C.) Limited, London, England, a British company
No Drawing. Filed Sept. 13, 1966, Ser. No. 578,973
Claims priority, application Great Britain, Sept. 15, 1965, 39,484/65
3 Claims. (Cl. 260—465)

This invention relates to polyhalogeno-aromatic nitriles and to their preparation. The term "polyhalogeno-aromatic compound" as used herein means an aromatic compound containing at least two halogen atoms, which may be the same or different, attached to an aromatic nucleus.

The present invention consists in the class of polyhalogeno-aromatic nitriles of the general formula:

$$C_6X_{(6-a-b)}(CN)_aY_b$$

Where the six carbon atoms form an aromatic nucleus to which substituents X, Y and —CN are all directly attached, and wherein: $a$ is 1, 2 or 3; $b$ is 1 or 2; $(6-a-b)$ is 2, 3 or 4; X is chlorine or fluorine; and Y is an electron-withdrawing group. The electron-withdrawing group Y may be —$NO_2$ 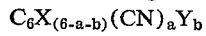 —$CF_3$ or other perfluoroalkyl group, —$SO_2Cl$, —$CCl_3$, —$COCH_3$, —COOH, —$CONH_2$, or —$SO_3H$; however, this list is by no means exhaustive.

Preferred compounds are those which contain four halogen atoms (preferably four fluorine atoms) one nitro-group and one nitrile group. Thus, the three compounds 3,4,5,6-, 2,4,5,6- and 2,3,5,6-tetrafluoronitrobenzonitrile are particularly envisaged by the present invention. The compounds of this invention have proved to be useful in the context of bacteriostatic and fungistatic activity and the o- and p-nitrotetrafluorobenzonitriles have proved to be particularly useful in this context. These compounds have proved especially effective against the organisms *A. niger, P. expansum, C, albicans* and *T. mentagrophytes*.

However, apart from these specific uses the compounds have a general utility as chemical intermediates in the production of halogenoaromatic, and more particularly fluoroaromtic compounds. These latter compounds, by virtue of their high fluorine content are useful as specialised solvents and as heat-exchange liquids stable to heat and to nuclear radiation.

The invention further consists in a method for the preparation of the class of compounds specified above, which method comprises treating a compound having the formula $$C_6X_{(6-a-b)}Z_aP_b$$

where $a$, $b$ and X are as defined in claim 1, Z is a halogen atom and P is either —H or —$NM_2$ with two reagents in either order:

(a) A reagent which reacts with P to introduce one or two electron-withdrawing groups into the molecule, and (b) A solution of a metal cyanide which reacts with halogen atoms to introduce one or more nitrile groups into the molecule.

Stages (a) and (b) may be carried out in either order, but generally Step (a) is carried out first.

The electrophilic reagent may be, for example, a nitrating agent. Either a conventional nitrating agent (e.g. $HNO_3/H_2SO_4$) or in some cases where highly fluorinated compounds are used as starting materials, a system consisting of an alkali metal nitrate (e.g. $KNO_3$) in anhydrous HF may be used.

The metal cyanide may be cuprous cyanide or potassium cyanide. It should be noted that if Step (b) is carried out before Step (a) care must be taken not to attack the nitrile group during the subsequent treatment with the reagent of Step (a). Thus, for example, in one alternative method for the preparation of the nitronitriles, the nitrile group is introduced into the molecule first and the benzene ring is thereafter aminated to the aminonitrile. The amino-group is finally oxidised to the nitrogroup.

A hydrogen atom in the starting matreial is generally the site for attack by the reagent of Step (a). Usually, there will be at least one halogen atom other than fluorine to serve as a site for attack by the cyanide to give the nitrile. Thus, where necessary bromination or chlorination may be carried out after Stage (a) if the starting material would not otherwise undergo the Stage (b) to give the nitrile. It is worthy of note that if KCN is used as the metal cyanide, it may be used to replace a fluorine atom directly.

The following examples illustrate the invention. Temperatures are °C. throughout.

Example 1.—2-nitro-tetrafluorobenzonitrile 1,2-dihydrotetrafluorobenzene (1 mole) was nitrated with $HNO_3/H_2SO_4$ mixture (C.$HNO_3$—150 cc.+C.$H_2SO_3$—250 cc.)

at 10°. The reaction mixture was then poured onto ice and the organic material after washing and drying was fractionated to give 2,3,4,5 - tetrafluoronitrobenzene, B.P. 90–91°/30 mm. Yield 65%.

Oleum (65%.67 ml.) was slowly added into a mixture of the 2,3,4,5-tetrafluoronitrobenzene (0.6 mole) and bromine (0.4 mole) and the reaction mixture was stirred at 50–55° for 2 hours. The product was isolated by pouring the mixture onto ice, separating the organic layer and fractionating it. A liquid product of 2,3,4,5-tetrafluorobromonitrobenzene was collected, B.P. 82–84°/17 mm. Yield 60%.

2-bromotetrafluoronitrobenzene (11.0 g.) was stirred with cuprous cyanide (4.5 g.) in boiling dimethylformamide (50 ml.) for 2 hours. The usual work-up and distribution gave a fraction (3.4 g.), B.P. 70–74°/4 mm. identified as the required nitronitrile by infrared analysis.

Example 2.—3-nitro-tetrafluorobenzonitrile 1,3-dihydrotetrafluorobenzene (0.7 mole) and the nitrating mixture (C.$HNO_3$—50 ml. and C.$H_2SO_4$—100 ml.) were stirred at 5–10° for 1 hour and then poured onto crushed ice. The organic layer was separated, dried and fractionated to give a liquid product of 2,3,4,6-tetrafluoronitrobenzene, B.P. 76–77°/20 mm. Yield 50%.

While refluxing a mixture of bromine (0.22 mole) and the 2,3,4,6-tetrafluoronitrobenzene (0.295 mole), 65% oleum (32.5 ml.) was run in. After 4 hours at 55–60° the reaction mixture was poured onto ice and digested with $SO_2$ to remove any excess of bromine. The separated organic layer was washed, dried and distilled. A colourless mobile liquid 2,3,4,6-tetrafluorobromonitrobenzene, B.P. 90–91°/10 mm. was collected. Yield 69%.

The desired product was then formed by reaction with suprous cyanide as described in Example 1.

Example 3.—4-nitro-tetrafluorobenzonitrile 2,3,5,6-tetrafluoroaniline (0.76 mole) in methylene chlorine (250 ml.) was slowly added into a solution of peroxytrifluoroacetic acid (2.37 moles) in methylene chloride (400 ml.) and refluxed for 3 hours. Water (800 ml.) was then added and the lower organic layer separated, dried and distilled. After evaporation of the solvent 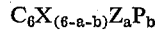 $CH_2Cl_2$ the organic residue was fractionated to yield a liquid product of 2,3,5,6-tetrafluoronitrobenzene, B.P. 89–90°/43 mm. Yield 75%.

65% oleum (25 ml.) was added slowly over 1 hour into a stirred mixture of bromine (0.16 mole) and 2,3,5,6-tetrafluoronitrobenzene (0.28 mole). After 2 hours of refluxing, the reaction mixture was poured onto ice and the organic layer, after washing, was dried and fractionated. The 2,3,5,6-tetrafluorobromonitrobenzene isolated is low melting solid, B.P. 99–100°/20 mm. Yield 65%.

The desired product was then formed by reaction with cuprous cyanide as described in Example 1.

Example 4.—4-nitro-tetrafluorobenzonitrile

Ammonia (160 ml.—0.88) was added into pentafluorobenzonitrile (0.8 ml.) and stirred at 80° for 3 hours. Water (1000 cc.) was then added and the reaction mixture was refluxed for 25 minutes. When cold the solid was filtered off and recrystallised from meths/water to give 4-amino-tetrafluorobenzonitrile, a white solid, M.P. 94–96°. Yield 80%.

A solution of the 4-aminotetrafluorobenzonitrile (0.37 mole) in dry methylene chloride (250 ml.) was added into a solution of peroxytrifluoroacetic acid (1.17 moles) in $CH_2Cl_2$ (200 ml.). The mixture was refluxed for 5 hours and then diluted with water (300 ml.). The organic layer so formed was separated, washed, dried and distilled to give a fraction B.P. 100–102°/5 mm., which solidified into pale yellow solid, M.P. 82–84°. Yield of the desired product 77%.

Example 5.—4-cyano-2,3,5,6-tetrafluorobenzoic acid

Sodium nitrite (170 g., 2.46 moles) was added over 45 minutes to a suspension of 4-aminotetrafluorobenzonitrile (432 g., 2.27 moles) (prepared as in Example 4) in anhydrous hydrofluoric acid (500 ml.) at 0°. After 30 minutes a solution of cuprous bromide (330 g., 2.3 moles) in hydrobromic acid (47%, 1 l.) was added over 3 hours at 0°. After working up by methylene chloride extraction, the product was distilled to give 4-bromotetrafluorobenzonitrile (355 g., 62%), B.P. 99°/15 mm., M.P. 77–19°. (Found: C, 32.8; F. 30.1; Br, 31.0. $C_7BrF_4N$ requires C, 33.0; F, 29.9; Br, 31.5%.)

A mixture of the 4-bromotetrafluorobenzonitrile (100 g., 0.4 mole) and concentrated sulphuric acid (100 ml.) was heated for 1 hour at 90° and then poured onto ice. The resulting precipitate was crystallised from aqueous ethanol to give 4-bromotetrafluorobenzamide (101 g., 94%), M.P. 188–190°. (Found: C, 30.9; H, 0.8; F, 27.6 $C_7H_2BrF_4NO$ requires C, 30.9; H, 0.7; F, 27.9%.)

The 4-bromotetrafluorobenzamide (32 g., 0.118 mole) was kept in boiling 50% sulphuric acid (230 ml.) for 24 hours. On cooling, a solid precipitated. It was recrystallised from benzene and then sublimed at 130°/1 mm., to give 4-bromotetrafluorobenzoic acid (30 g., 94%), M.P. 138–140°. (Found: C, 30.5; H, 0.4; F, 27.8; equiv. 277. $C_7HBrF_4O_2$ requires C, 30.8; H, 0.4; F, 27.8%; equiv. 273.) A mixture of cuprous cyanide (1.9 g., 0.02 mole), dimethylformamide (15 ml.) and the 4-bromotetrafluorobenzoic acid (2.73 g., 0.01 mole) were boiled for 2 hours and then poured into a solution of ferric chloride (4 g.) in hydochloric acid (9 ml.). The mixture was extracted with ether. The solvent was distilled from the extract and the solid which remained was recrystallised from carbon tetrachloride to give a yellow solid, M.P. 169–171°, shown by infrared analysis to be the title compound. v. max 2240 (C≡N), 1755 (C=) in ester and 1460 cm.$^{-1}$ (fluorinated benzene ring).

Example 6.—Methyl 4-cyano-2,3,5,6-tetrafluorobenzoate

A mixture of 4-bromotetrafluorobenzoic acid (as prepared in Example 5) (4.5 g., 0.016 mole) methyl alcohol (20 ml.) and a catalytic amount of concentrated sulphuric acid was heated under reflux for 5 hours. On cooling, water (60 ml.) was added and the precipitate filtered off. This crude solid was recrystallised from aqueous ethanol to give methyl 4-bromotetrafluorobenzoate (4 g., 84%), M.P. 57–59°. v. max. 1730 cm.$^{-1}$ (C=O in ester), 1465 cm.$^{-1}$ (fluorinated benzene ring) and 1390 cm.$^{-1}$ ($CH_3$).

A mixture of the methyl 4-bromo-2,3,5,6-tetrafluorobenzoate (2.87 g., 0.01 mole), cuprous cyanide (1.0 g., 0.011 mole) and dimethylformamide (20 ml.) was boiled for 2 hours then cooled and poured into a solution of ferric chloride (4 g.) in hydrochloric acid (9 ml.). The mixture was ether extracted, the extract dried, filtered and distilled. On evaporation of the solvent a solid remained which was identified by the infrared analysis as the title compound. v. max. 2260 (C≡N), 1755 (C=O in ester) and 1460 cm.$^{-1}$ (fluorinated benzene ring).

Example 7.—4-cyano-heptafluorotoluene 4-bromotetrafluorobenzoic acid (as prepared in Example 5) (27.3 g., 0.1 mole) was heated with sulphur tetrafluoride (38 g., 0.35 mole) at 120° for 18 hours in a stainless steel autoclave. The liquid product was washed with water and sodium charbonate solution, dried and distilled to give 4-bromoheptafluorotoluene (21 g., 70%), B.P. 72–73°/43 mm. v. max. 1495 cm.$^{-1}$ (fluorinated benzene ring), 1155 and 1325 cm.$^{-1}$ ($CF_3$ on aromatic ring).

A mixture of the 4-bromoheptafluorotoluene (11.9 g., 0.04 mole) cuprous cyanide (4 g., 0.044 mole) and dimethylformamide (35 ml.) was boiled for 2 hours and then poured into a solution of ferric chloride (8 g.) in hydrochloric acid (18 ml.) When cold the reaction mixture was ether extracted. The extract was dried, filtered and the solvent evaporated leaving a liquid residue which was fractionated giving a fraction, B.P. 81–85°/45 mm., identified as 4-cyanoheptafluorotoluene by infrared analysis. v. max. 2260 (C≡N), 1160 and 1345 cm.$^{-1}$ (trifluoromethyl group on aromatic ring), 1500 cm.$^{-1}$ (trifluorinated benzene ring).

A solid by-product was 4,4'-bis(trifluoromethyl) octafluorobiphenyl, M.P. 98–100° (from aqueous eethanol), max. 1480 cm.$^{-1}$ (fluorinated benzene ring), 1160 and 1320 cm.$^{-1}$ ($CF_3$ on aromatic ring).

Example 8.—2-nitro-tetrafluorobenzonitrile 2,3,4,5-tetrafluoroaniline (225 g.) and glacial acetic acid (400 ml.) were mixed and then bromine (220 g.) was slowly added and the mixture boiled for 2 hours. The precipitated 2-bromotetrafluoroacetanilide was filtered off and hydrolysed with 50% sulphuric acid (800 ml.). The free amine (273 g.) isolated by steam distillation was distilled to give 247 g. 2-bromotetrafluoroaniline, yield 78%, B.P. 60–64°/0.3 mm., M.P. 51.5–53°. (Found: C, 29.5; H, 0.9; F, 31.2. $C_6H_2BrF_4N$ requires C, 29.6; H, 0.8; F, 31.1%.)

This product was then reacted with potassium cyanide, to give 2-aminotetrafluorobenzonitrile.

The 2-aminotetrafluorobenzonitrile (9.5 g., 0.05 mole) in methylene chloride (25 ml.) was added into a solution of peroxytrifluoro acetic acid (0.15 mole) in methylene chloride (50 ml.). The reaction mixture was boiled for 12 hours then water (100 ml.) was added. The organic layer was separated, washed and distilled to give the nitronitrile, B.P. 75–76°/0.7 mm. (Found: C, 38.0; F, 34.3. $C_7F_4N_2O_2$ requires C, 38.2; F, 34.5%.)

Example 9.—3-nitro-tetrafluorobenzonitrile

Into a solution of 2,3,4,6-tetrafluoroaniline (31 g., 0.18 mole) and glacial acetic acid (80 ml.) bromine (33 g., 0.41 g. atom) was added. The mixture was boiled under reflux for 3 hours then cooled and methylene chloride extracted. Evaporation of the solvent left a dark residue which was hydrolysed with 50% sulphuric acid (100 ml.). The mixture was ether extracted and the extract dried, filtered and distilled to give 3-bromotetrafluoroaniline, B.P. 60–61°/5 mm., M.P. 38–40°.

This product was reacted with potassium cyanide, and then oxidised with peroxytrifluoroacetic acid, as described in Example 8, to give the desired product.

Example 10.—4-nitro-tetrafluorobenzonitrile

A mixture of bromopentafluorobenzene (50 g., 0.2 mole) and 0.880 ammonia (34 ml.) was heated in a glass ampoule for 17 hours at 180–190°. The mixture was poured into water and extracted with methylene chloride. The extract was distilled leaving a residue which was fractionated using a 1 ft. distillation column to give 4-bromo-tetrafluoroaniline, B.P. 104–106°/15 mm., M.P. 57–59°. (Found: C, 29.5; H, 1.0; F, 30.9. Calculated for $C_6H_2BrF_4N$: C, 29.6; H, 0.8; F, 31.1%.)

This product was reacted with potassium cyanide, and then oxidised with peroxyltrifluoroacetic acid, as described in Example 8, to give the desired product.

I claim:
1. 3,4,5,6-tetrafluoronitrobenzonitrile.
2. 2,4,5,6-tetrafluoronitrobenzonitrile.
3. 2,3,5,6-tetrafluoronitrobenzonitrile.

References Cited

UNITED STATES PATENTS

| | | | |
|---|---|---|---|
| 3,284,484 | 11/1966 | Belf et al. | 260—465 |
| 3,290,353 | 12/1966 | Battershell et al. | 260—465 |

FOREIGN PATENTS

| | | |
|---|---|---|
| 862,863 | 3/1961 | Great Britain. |

CHARLES B. PARKER, *Primary Examiner.*
S. T. LAWRENCE III, *Assistant Examiner.*